United States Patent
Denecheau et al.

(10) Patent No.: US 6,611,874 B1
(45) Date of Patent: Aug. 26, 2003

(54) METHOD FOR IMPROVING ROUTING DISTRIBUTION WITHIN AN INTERNET AND SYSTEM FOR IMPLEMENTING SAID METHOD

(75) Inventors: Lionel Denecheau, Vence (FR); Denis Esteve, Vence (FR); Christophe Jourdet, Raleigh, NC (US); Pascal Thubert, Vence (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/396,934

(22) Filed: Sep. 15, 1999

(30) Foreign Application Priority Data

Sep. 16, 1998 (EP) .............................. 98480062

(51) Int. Cl.⁷ ....................... G06F 15/173; H04L 12/50; H04L 12/56
(52) U.S. Cl. ....................... 709/239; 709/241; 709/240; 709/238; 370/400; 370/357
(58) Field of Search ............................... 709/238, 240, 709/241, 239; 370/357, 400

(56) References Cited

U.S. PATENT DOCUMENTS

| | | | | |
|---|---|---|---|---|
| 5,596,719 A | * | 1/1997 | Ramakrishnan et al. | 395/200.02 |
| 5,638,516 A | * | 6/1997 | Duzett et al. | 395/200.15 |
| 5,802,503 A | * | 9/1998 | Sansone | 705/401 |
| 5,845,091 A | * | 12/1998 | Dunne et al. | 395/200.7 |
| 6,044,075 A | * | 3/2000 | Le Boudec et al. | 370/351 |
| 6,347,078 B1 | * | 2/2002 | Narvaez-Guarnieri et al. | 370/230 |
| 6,363,319 B1 | * | 3/2002 | Hsu | 701/202 |
| 6,438,133 B1 | * | 8/2002 | Ervin et al. | 370/403 |

OTHER PUBLICATIONS

Leon-Garcia et al., "Communications Networks: Fundamental Concepts and Key Architectures", McGraw-Hill.*

* cited by examiner

Primary Examiner—Dung C. Dinh
Assistant Examiner—Marlon Johnson
(74) Attorney, Agent, or Firm—Carlos Munoz-Bustamante (57) ABSTRACT

A method for improving next hop selection between internet routers (R) defined by their respective IP addresses. A source is identified by a source IP address and a source port identification. A destination or target is defined by a target port identification. Equivalent routes toward the destination host are identified conventionally. Each of the equivalent routes is defined by next router IP address. The source IP address, source port identification and target port identification are logically combined to derive a connection identifier (HO) for a first router common to all paths. An set of additional logical operations are performed to derive next hop selection identifiers. Final next hop route selection is based on predefined criterion.

7 Claims, 5 Drawing Sheets

SOURCE IP ADDRESS

SOURCE PORT id

TARGET PORT id

R2 IP ADDRESS

R3 IP ADDRESS

R4 IP ADDRESS

METHOD FOR IMPROVING ROUTING DISTRIBUTION WITHIN AN INTERNET AND SYSTEM FOR IMPLEMENTING SAID METHOD

FIELD OF THE INVENTION

This invention deals with a method for statistically improving routing within an internet, and more particularly for improving next hop selection between internetwork routers.

BACKGROUND OF THE INVENTION

Modem digital networks operate using different transmission media and interconnect on demand a very large number of users (e.g. hosts) and applications through fairly complex digital communication networks.

Due to the large variety of users'profiles and distributed applications, network traffic is making greater bandwidth demands, exhibits less regular patterns and must be delivered to more uses and more widely separated destinations. This has driven the development fast packet switching techniques in which data from different origins are segmented into fixed or variable length packets (generically referred to as datagrams, with both expressions "packets" and "datagrams" being equally used herein) and then transferred, over high speed digital networks, between data source and target terminal equipments.

Several types of networks have been installed throughout the world, which need to be interconnected (e.g. via so called Routers) to optimize the possibilities of organizing traffic between source host terminal(s) and.target host terminal(s) located anywhere in the world. This is made possible by using so-called internetworking.

Internetwork (also referred to as internet) facilities use a set of networking protocols such as Transmission ControlProtocol/Internet Protocol (TCP/IP) developed to allow cooperating host computers to share resources across the internetwork. TCP/IP is a set of data communication protocols that are referred to as an internet protocol (IP) suite. Because TCP and IP are the best known, it has become common to use the term TCP/IP to refer to the whole protocol family. TCP and IP are two of the protocols in this suite. Other protocols of the suite include User Datagram Protocol (UDP), Address Resolution Protocol (ARP), and Real Time Protocol (RTP).

An internet may be viewed as a collection of heterogeneous and independent networks using TCP/IP and connected together by routers. The administrative responsibilities for an internet (e.g., assignment of IP addresses and domain names) can be within a single network (LAN) or distributed among multiple networks. To enable sending data from any source host to any target host connected to the internet, routing protocols have been defined. They include Routing Information Protocol (RIP) and Open Shortest Path First (OSPF) protocol using personalized so-called Routing Tables to define inter-router paths on a hop-by-hop basis, asynchronously from source to target. To that end, internetwork routers keep exchanging up-to-date network topology information and building up their Routing Tables.

Accordingly, whenever a source host (S) needs to send a data packet through the internet to a target host (T), S contacts its "default" router asking the router to send the packet toward the target (T). Routing within any given router R is based only on target identification. When running OSPF, the system looks for the "best" path toward the destination T. By "best" path one usually means shortest (i.e. involving minimum router "hops"). But for purposes of the invention, a "best" path may also take into account minimum cost and optimized bandwidth occupation. Lleased links costs may need to be taken into consideration when setting the path throughout the internet networks. In case of equivalent paths OSPF usually selects the first path identified within router Table.

Figure 1:
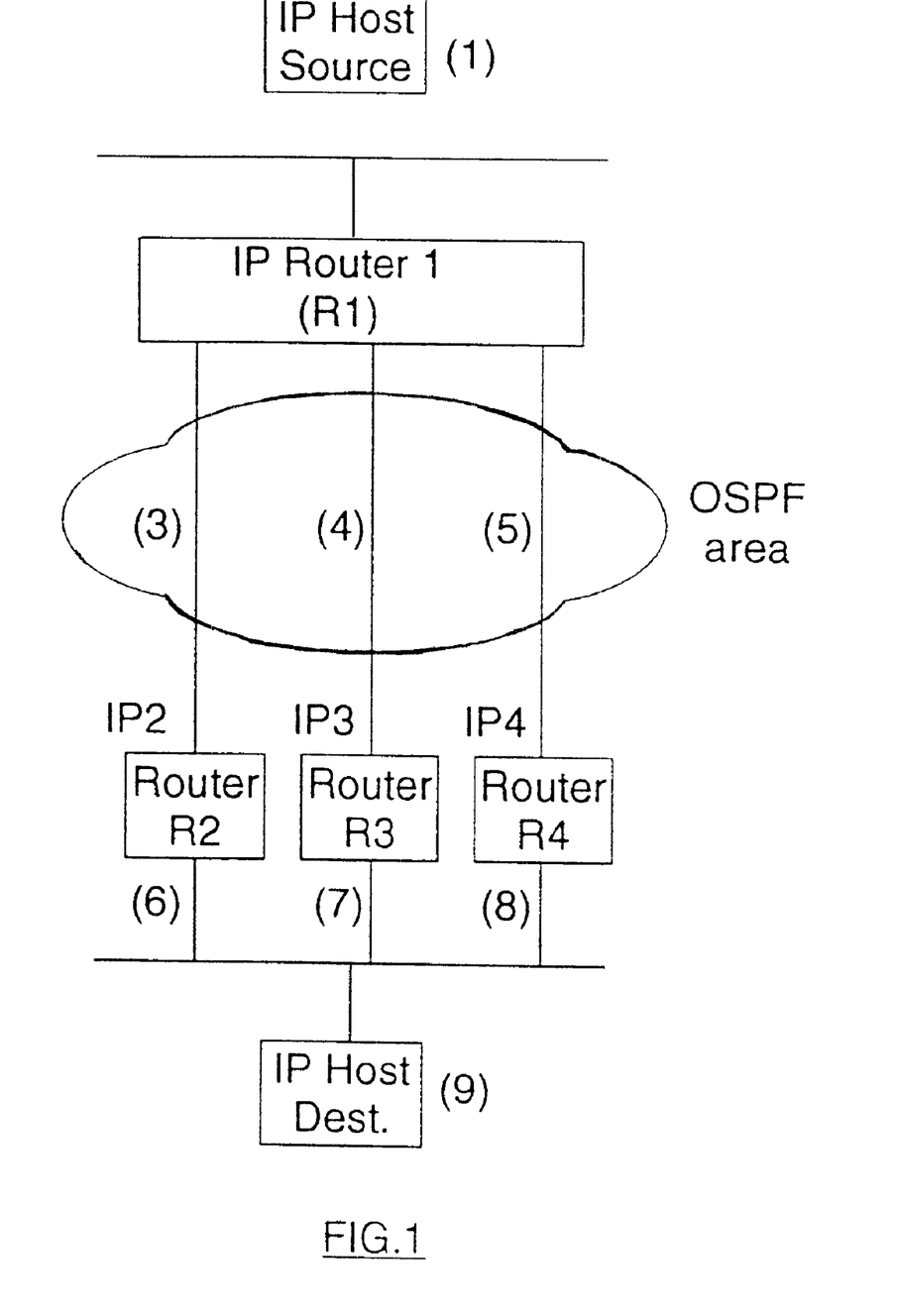
FIG. 1 is a schematic representation of a portion of the internet used to illustrate the invention.

Some improvements have been made in OSPF to avoid always using same paths which can lead to overloading some network paths and concurrent underutilization of others. For instance, in case of "equivalent" paths being identified some kind of "round robin" or per packet multipath algorithm may be executed to achieve load balancing. To further illustrate the above, consider an example of operation (see FIG. 1). Assume source IP Host (1) transmits IP traffic to IP destination Host(9). All this traffic goes to IP Router 1 (R1).Router 1 learns the routes to IP Destination Host (9) using the OSPF routing protocol. As schematically illustrated in FIG. 1, there are three different routes from IP Router 1 to IP destination host (9), one via Router R2 (path 3), one via Router R3 (path 4) and one via Router R4 (path 5). Each route has an associated "cost". OSPF selects the route with lowest cost and all traffic is sent over that selected route. Where "equivalent" routes are detected, the first route in the Router R1 Table is selected.

However, when the OSPF Per Packet Multipath option is enabled in IP Router R1 and when the costs of all three routes are equal, IP Router R1 keeps the three routes. IP traffic is then transferred equally on all these routes, in round robin operating mode, on a per packet basis. A first IP packet to be transmitted is sent on the first route (Route (3)), a second IP packet is sent over the second route (Route (4)), a third packet is sent on third route (Route (5)), a fourth packet is then assigned the first route (Route (3)) again, and so on.

In practice, the system operation is a little more complex. Each network router includes a routing table and a cache storing the actual path(s) to be followed. Then the system may assign a different route to each packet or keep sending packets over the same route until the cache is refreshed, in which case the router switches to next route.

This enables balancing the IP traffic on all available "equivalent" routes, and accordingly, balances the traffic, as much as possible, over equivalent routes across the internet.

However, this function uses a static cost parameter, set at network configuration time. It does not take any congestion on one of the "equivalent" routes into consideration, while congestion may and actually does, occur.

Assume one of the routes shown in FIG. 1, e.g. route (5), is congested due to the maximum bandwidth being used on the connection between IP Router R1 and Router R4. In this case, the OSPF Per Packet Multipath Function keeps using the route (5) because the OSPF cost does not change even though the link (5) is congested. IP Router R1 may still distribute packets over all three routes, but the packets assigned to route (5) will be queued in Router R1 until link 5 exits from congestion. The IP Destination Host (9) then receives and acknowledges all the IP packets, except those transmitted over path 5. The Destination Host must then wait for the IP packets on path (5) before it can provide the complete set of data to its application. As a consequence, with the OSPF Per Packet Multipath operating mode, the delay introduced in the connection between Source and Destination (Target) hosts is the highest delay on all the different assigned routes. In addition, if three TCP Connections are established from IP source (1) to destination (9) for each of the three connections, IP packets are sent over the three different routes. This means that all the three connections will be impacted by the delay introduced on route (5).

More precisely, when packets P1, P2, P3 . . . are sent by any source host toward a Target host, the target host acknowledges reception of the last received packet.

In fact acknowledgment addresses a number of bytes, but as far as the invention is concerned that does not affect the rationale. Assuming then P2 misses, the target host shall keep acknowledging P1, even if P3, . . . are received. The system runs then a Fast Recovery protocol to generate retransmission of P2 from the source host until P2 is received.

In any case the overall consequence is that the efficiency of the network is seriously affected. Assuming one path goes through a 200 Kbps link and one or several go through 1 Mbps link(s), the practical result is that the system might be biased by the 200 Kbps rate of operation.

OBJECTS OF THE INVENTION

One object of this invention is to provide a method and system to enable balancing IP traffic on all available equivalent routes without being seriously impacted by congestion phenomenon occurring on one of said routes.

Another object of this invention is to provide a method and system to allow using the OSPF Per Packet Multipath Function without impacting all the connections when a route becomes congested.

A further object of this invention is to provide a method and system enabling using the OSPF Per Packet Multipath Function without creating network performance degradation in case of congestion on any selected route while taking into consideration cost or bandwidth criteria.

These and other objects, features and advantages of this invention will be made apparent from the following more detailed description of a best mode of implementation.

SUMMARY OF THE INVENTION

This invention deals with a method for improving next hop selection between internet routers (R) defined by their respective IP addresses, to orient the traffic between a source host (S) identified by a source IP address and a source port identification and a destination host(T) defined by a target port identification. To that end, equivalent routes toward the destination (T) host are identified, each of said equivalent routes being defined by next router (R) IP address. A first predefined logical combination between said source (S) IP address, S port identification and T port identification is performed to derive a so-called connection identifier (HO). Then a second predefined logical operation between HO and each next equivalent route R IP address is performed, to derive so-called next hop selection identifiers therefrom. And finally next hop route is selected based on a predefined criterion among said selection identifiers.

DESCRIPTION OF PREFERRED EMBODIMENT

The internetwork operation is, in fact, more complex than described above. To enable a better appreciation for the invention, the internetworking operations will be described in more detail.

TCP/IP is a layered set of protocols. In order to understand what this means, consider an example of a file transfer to be performed between hosts. This involves a protocol of the suite known as File Transfer Protocol (FTP) defining a set of commands that one machine sends to another (i.e. commands to specify a user ID and password, file to retrieve, in which directory to store the file etc.) FTP, like other application protocols, simply defines a set of commands and messages to be sent, but, using TCP and IP, assumes that there is a reliable way to communicate.

TCP is responsible for making sure that the commands get through to the other end. TCP keeps track of what is sent and retransmits anything that did not get through. If a file is too large for one datagram, TCP will split the file up into several datagrams and make sure that they all arrive correctly. Since these functions are needed for many applications, they are put together into a separate protocol, rather than being made part of the file transfer protocol.

TCP can be viewed as a library of routines that applications can use when they need reliable network communications with another application running on another computer. TCP calls on the services of IP. Although the services that TCP supplies are needed by many applications, there are still some kinds of applications that do not need them. However, there are some services that every application needs. These services are put together into IP.

As with TCP, IP can be considered as a library of routines that TCP calls on, but which are also available to applications that do not use TCP. The strategy of building several levels of protocol is called layering.

Applications programs, such as FTP and TELNET, TCP and IP can be considered separate layers, each of which calls on the services of the layer below it. Generally, TCP/IP uses four layers: an application layer, a transport layer, an internetworking layer and a network interface layer.

The application layer contains at least one user process cooperating with another process on the same or a different host. Example are TELNET (a protocol for remote terminal connections), FTP (File Transfer Protocol) and SNMP (Simple Network Management Protocol).

The transport layer is a layer such as TCP that provides reliable, connection-oriented transport services needed by many applications. As an alternative for applications that do not require all the functions offered by TCP, the simpler but less reliable transport functions of UDP can be used.

The internetworking layer is also called the network layer. The most important protocol is the internet protocol (IP). IP provides the basic service of getting datagrams to their destination. It is a connectionless protocol that does not assume reliability from the lower layers.

The network interface layer includes the data link control (DLC) and the physical layer. This interface may or may not provide reliable delivery and may be packet or stream-oriented. In fact, TCP/IP does not specify any protocol here, but can use almost any network interface available. The data link layer contains the protocols needed to manage a specific physical medium, such as token-ring or a point-to-point line. The physical layer defines the mechanical and electrical characteristic required to attach a device to a network.

As mentioned above, TCP/IP protocols are generally implemented across large numbers of independent networks connected together by routers. Stations should be able to access computers or other resources on any of these networks. Datagrams will often pass through multiple different networks before getting to their final destination. The routing needed to accomplish this is invisible to the user. As far as the user is concerned, all he needs to know in order to access another system is an Internet address.

Internet protocol (IP) addresses are 32-bit numbers. IP addresses are normally written in dotted decimal notation; that is, as four decimal numbers, each representing eight bits (one byte) of the address, separated by dots. Routing decisions within an Internet are always based on the IP address of the destination node. It is important to realize that an IP address does not identify a station, but rather a specific network interface. All routing within an internet is performed using the 4-byte long destination IP address.

Figure 2:
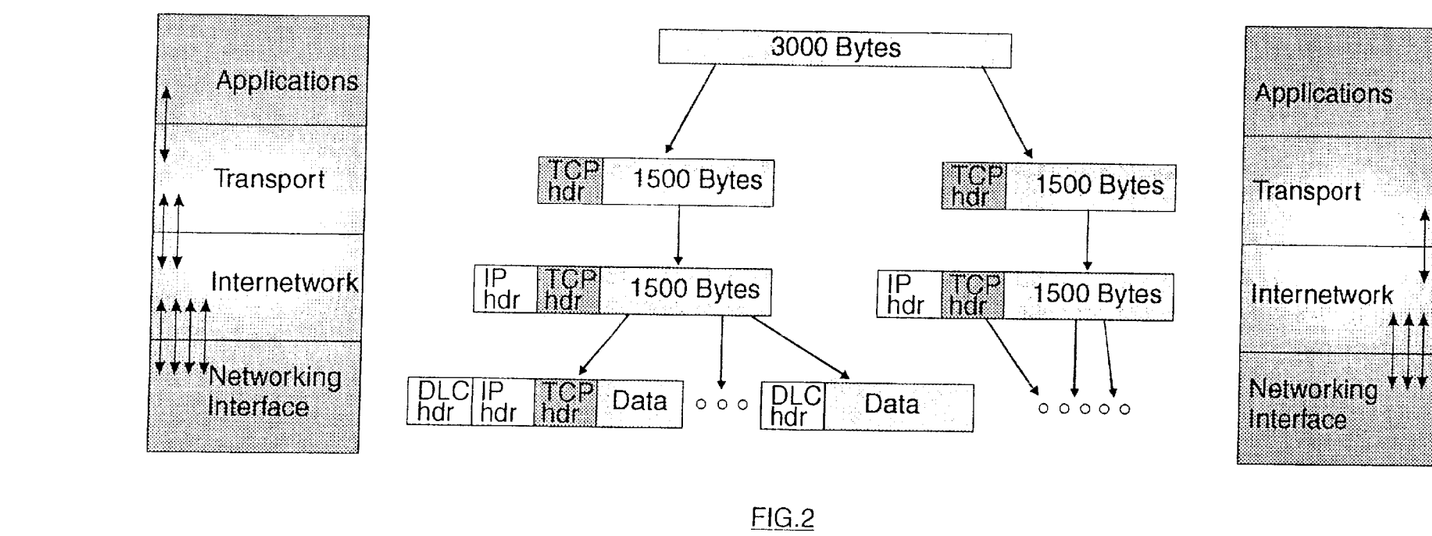
FIG. 2 illustrates conventional file fragmentation and packetization.

The IP layer is built on a connectionless technology. Information is transferred as a sequence of datagrams (or packets). A datagram is a collection of data that is sent as a single message. Each of these datagrams is sent through the network individually. Individual packets may be routed along different routes, and datagrams may be received in a different order than the order in which they were sent. TCP, which runs in a layer above IP, provides methods for establishing a connection that will continue for some time. TCP provides resequencing for datagrams that have been received out of order. For instance, referring to FIG. 2, assume an application provides a 3000-byte file. For networks (e.g., Ethernet) that cannot handle a 3000-byte datagram, the TCP protocols will break this file up into multiple small packets. Each of these packets is provided with a conventional TCP header (hdr) fully identifying the packet. This may be used to keep track of different file transfers. At IP and at network interface layer levels, each packet is provided with an IP header and a DLC header respectively. Each of these packets will be sent to the other end towards the target host. However, while those packets are in transit, the network does not know that there is any relationship between them. As explained, each packet might follow a different path throughout the internet toward the target or final destination. It is possible that the second packet will actually arrive before the first one. It is also possible that, an error will occur somewhere in the network and one or more of the packets might not get through at all. In that case, the missing packets have to be sent again.

In summary, TCP is responsible for breaking up (segmenting) the message into packets, reassembling them at the other end, resending anything that gets lost, and putting things back in the right order. IP (the internet protocol) is responsible for routing individual datagrams. The IP layer on intermediate (IP forwarding) network nodes may decide to segment packets as well. However, reassembly is then only done at end nodes.

It may seem like TCP is doing all the work. However, in a larger internet, getting a packet to its destination can be a complex job. Keeping track of the routes to all of the destinations and handling incompatibilities among different transport media turns out to be a complex job. These tasks are the responsibility of the IP layer.

The interface between TCP and IP is fairly simple. TCP simply hands IP a packet with a destination. IP delivers, using the services of the data link control layer, the packet directly to destination or forwards it to the next router in the direction of the destination. IP does not know how a packet relates to any packet before it or after it.

TCP/IP stations are identified by their IP addresses. The data exchanged between two stations employed in a TCP connection is usually routed through the internet based on the IP address of the receiving station (the destination IP address). Usually a single address is allocated per station, meaning that to keep track of multiple connections between two stations, TCP has to know of which connection a packet is part of. This task is referred to as demultiplexing. In fact, there are several levels of demultiplexing going on in TCP/IP.

The source and destination port numbers are used to keep track of different conversations. Suppose 3 different people are transferring files. A source's TCP might allocate port numbers 1000, 1001, and 1002 to these transfers. When the source sends a packet, this becomes the source port number. Of course the TCP at the other end has assigned a destination port number of its own for the conversation. The source TCP has to know the port number used by the other end as well. The source puts this in the destination port field. Of course, if the other end sends a packet back to the source, the source and destination port numbers will be reversed.

Each packet has a sequence number. This is used so that the destination can make sure that it gets the packets in the right order, and that it has not missed any. TCP does not number the packets but the bytes. So if there are 500 bytes of data in each packet, the first packet might be numbered 0, the second 500, the next 1000, the next 1500, etc.

To detect transmission errors a checksum is included in the TCP header. The checksum is a number that is based on the contents of the packet. The destination TCP processes the packet contents to generate its own checksum. The checksum generated at the destinationis compared to the checksum included in the packet header. If the two don't match, it is assumed that transmission errors have occurred and the packet is discarded.

The remaining items in the header are generally involved with managing the connection. In order to make sure the packet has arrived at its destination, the recipient has to send back an acknowledgment. This is a packet whose acknowledgment number field is filled in. For example, sending a packet with an acknowledgment of 1500 indicates that the destination has received all the data up to byte number 1500. If the sender does not get an acknowledgment within a reasonable amount of time, it sends the data again.

A window is used to control how much data can be in transit at any one time. It is not practical to wait for each packet to be acknowledged before sending the next one. That would slow things down too much. On the other hand, it would be unacceptable if stations just keep sending data as this might overrun the capacity of the receiving stations. Furthermore, if one or more routers are involved in the transmission, uncontrolled sending of data might lead to overrun of the intermediate routers, leading to congestion and performance degradation.

TCP is dependent on the functions of IP. When the TCP layer hands a packet over to IP, TCP informs the IP layer the internet address of the computer at the other end. The IP layer does not deal with what is in the packet or even in the TCP header. The task of the IP layer is simply to find a route for the packet and get it to the other end.

In order to allow routers or other intermediate systems to forward the packet the IP layer adds its own IP header.

Significant elements in this header are the source and destination internet (IP) address (32-bit addresses, such as 9.132.56.80), the protocol number, and another checksum. The source internet address is simply the address of the source host machine. It is required so the destination knows where the packet originated. The destination internet address is the address of the other (i.e. target) machine. It is necessary so any intermediate routers can route the packet toward its final destination. The protocol number is used by the destination IP layer to forward the packet to a TCP layer. Although most IP traffic uses TCP, there are other protocols that can use IP, making it necessary to identify the next protocol to be used in processing the packet. Finally, the checksum allows the destination IP layer to verify that the header was not damaged in the transit.

The above information clearly shows how complex the transmission of data through the internet, is, and may improve an appreciation for any routing method that enables optimization of traffic operation by balancing traffic over the different routes.

Given the above available tools, the invention shall enable maintenance of the same path for a given TCP connection. The router shall define a unique path for each fmal destination. As a consequence, links utilization between routers, as well as utilization of overall IP network bandwidth can be optimized.

Referring again to FIG. 2, a packet includes an IP header and a TCP header. The IP header includes a source IP address and a destination IP address, while the TCP header includes a source port and a destination port identifications. In other words, all of this information is available in each packet flowing within the internetwork.

Figure 3:
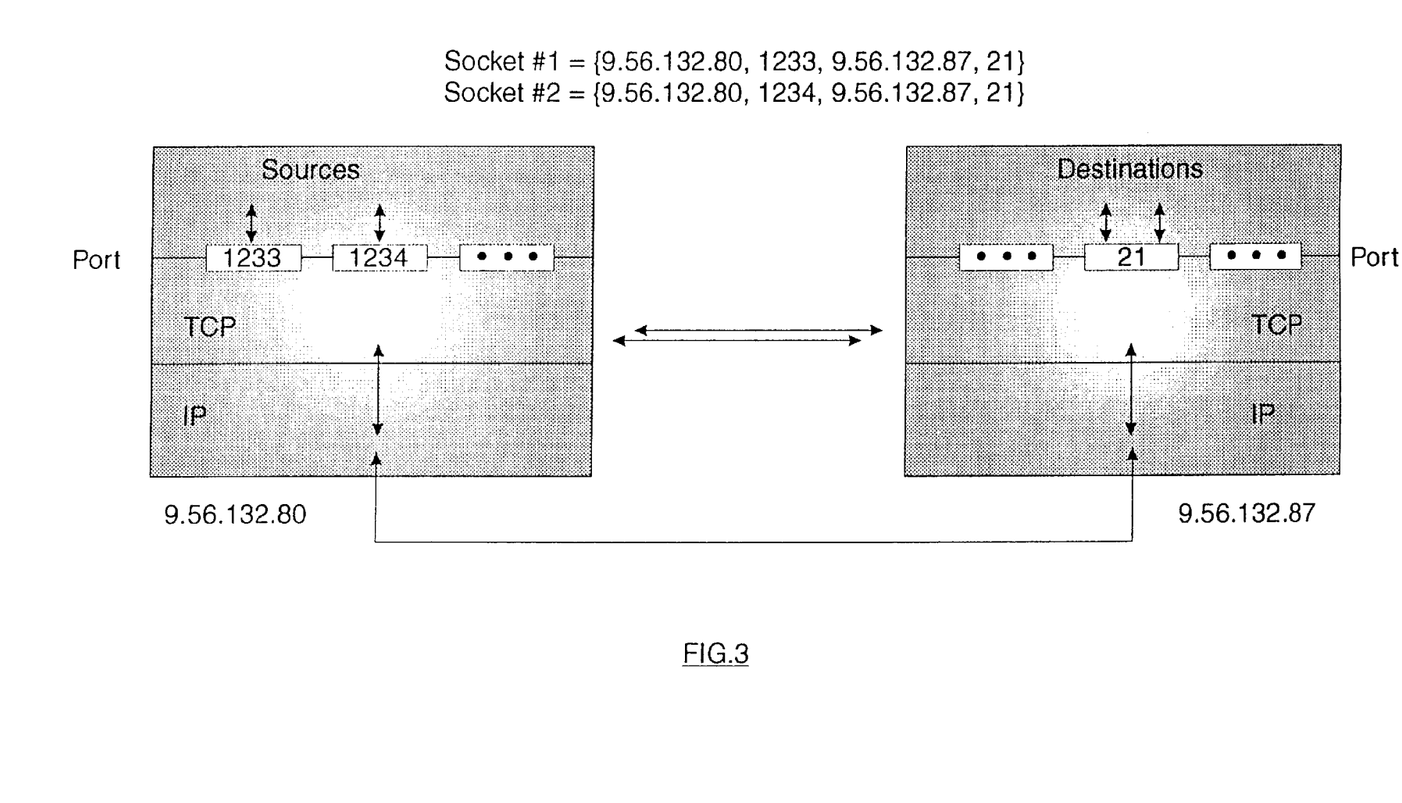
FIG. 3 illustrates sockets and ports to be used within the invention.

For instance, IP address 9.56.132.80/source port 1233 and destination IP address 9.56.132.87/destination port 21 as represented in FIG. 3 define a TCP connection. The connection is actually described by this set of four numbers representing a so-called "socket" including the IP address at each end and the TCP port at each end. FIG. 3 depicts a situation where two different sources (respectively attached to ports 1233 and 1234) are sending files to the same destination machine (attached to port 21). Then, both IP addresses (i.e. 9.56.132.80 and 9.56.132.87) remain the same.

The present invention uses the socket data to define a unique path for each socket-based connection. Routing is TCP connection based rather than round robin based. Load balancing per TCP connection is achieved instead of per packet multipath. It might be said that the system performs per connection multipath.

It should also be noted that while the implementation of this invention is described with TCP/IP, it applies to UDP/IP as well. The process of this invention might be implemented by dynamically computing all possible paths complying with the basic principles defined hereunder and storing these into tables. However, this implementation would not be considered efficient given both table sizes and reading/processing cycles required.

The preferred implementation of this invention uses a conventional routing process to determine, for each hop toward the target (T), "equivalent" routes toward a target. The invention then uses a new algorithm to select which of the equivalent paths which is actually to be used. The interface with routing tables (e.g. cache definition) is thus kept unchanged.

Referring back to FIG. 1, assume that the possible paths from Router 1 (R1) to destination IP host (9) through Router 2 (R2), Router 3 (R3), and Router 4 (R4) areq equivalent to each other. The routing table in R1 will identify the following paths as equivalents:

next hop (3): $R2 \rightarrow IP$ address $IP2$ next hop (4): $R3 \rightarrow IP$ address $IP3$ next hop (5): $R4 \rightarrow IP$ address $IP4$ Based on this information, the process can select the best of these routes to use by executing "hash coding" operations (i.e. predefined logical operations) on selected parameters, all as described below FIG. 4 represents data available in each packet:

a) a four-byte long Source IP address;

b) a two-byte long Source Port and Target (destination) port.

Figure 4:
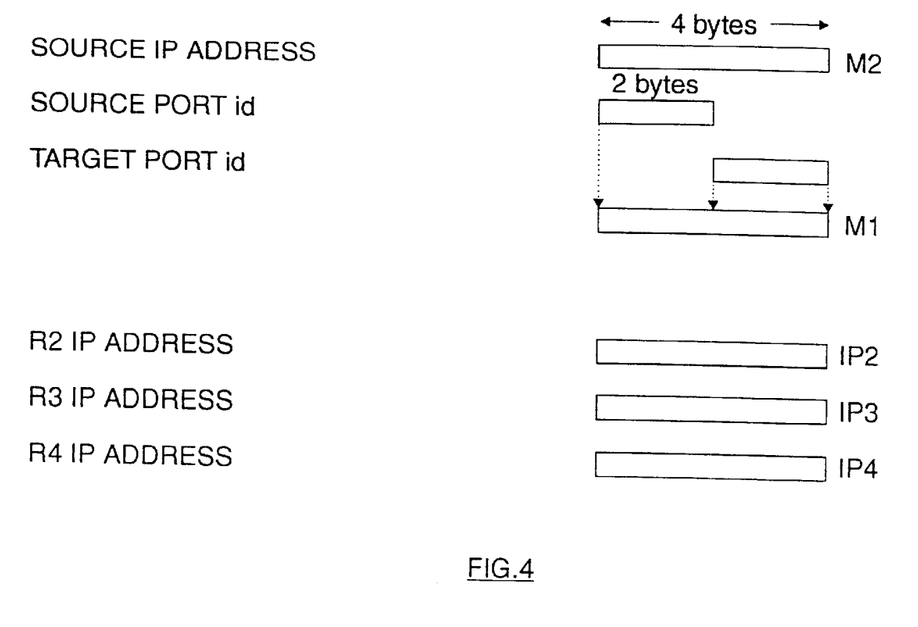
FIG. 4 is made to illustrates the ports and IP addresses used in the method of this invention.

FIG. 4 also shows following data available as four-byte words in the R1 routing table:

a) R2 IP address=IP2 b) R3 IP address=IP3 c) R4 IP address=IP4

Figure 5:
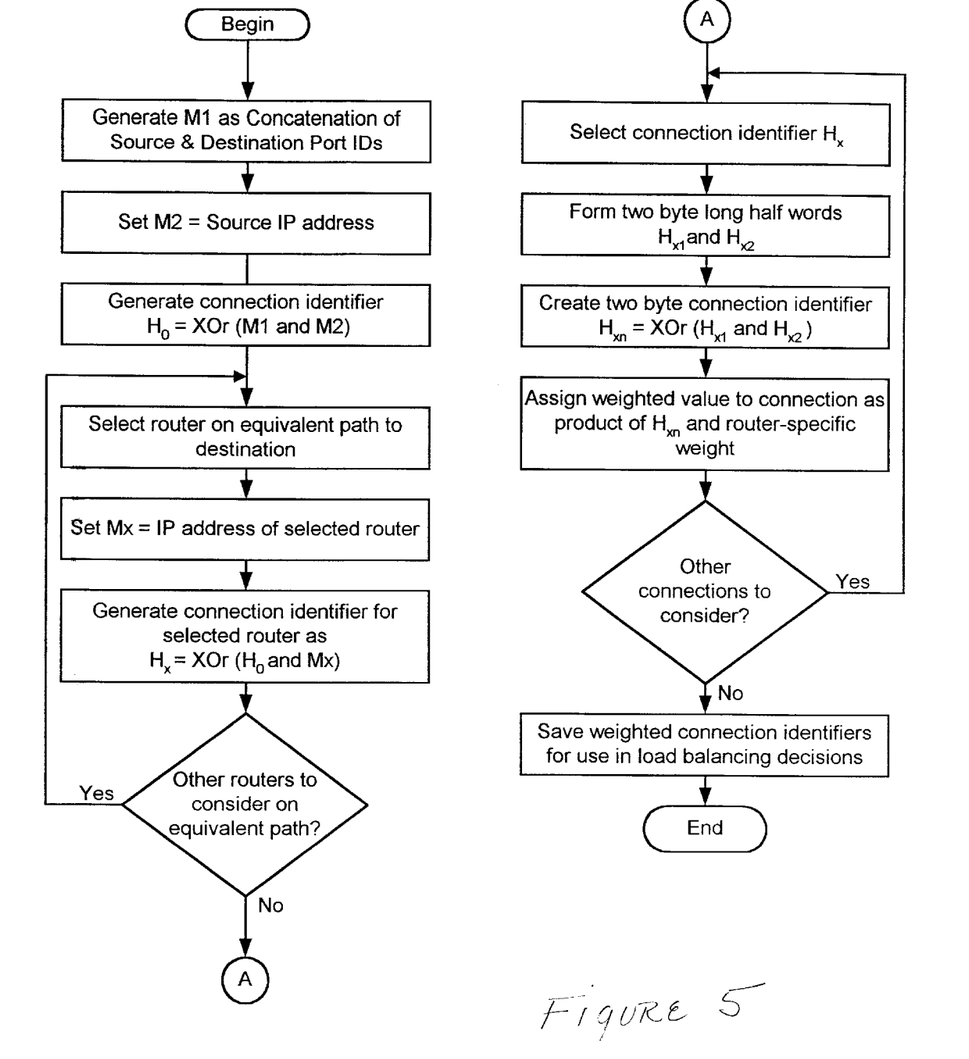
FIG. 5 is a flow chart of steps performed in carrying out the invention.

The method, shown in flowchart form in FIG. 5, is described below. Before discussing the method in detail, it should be noted that the flow chart assumes the existence of a plurality of equivalent routes on the source to destination path. Absent at least two equivalent routes, the present invention does not come into play.

The source port and destination port numbers are concatenated into a 4-bytes long word identified as M1. Assuming the source IP address is labeled M2, then a first "hash-coding" (e.g., logical exclusive OR or XOR operation) is performed on M1 and M2 to generate a connection identifier Ho:

$$M1(+)M2=Ho$$

The symbol (+) represents a XOR operation.

Once Ho is derived a second set of hash coding operations are performed for the three equivalent routes:

$$Ho(+)IP2=H2$$

$$Ho(+)IP3=H3$$

$$Ho(+)IP4=H4$$

A final path can then be selected from the three equivalent routes by applying predefined criteria to H2, H3 and H4.

Each of the identifiers H2, H3 and H4 is a 4-byte long word. Assume their decimal values are, for example 50, 5 and 20 respectively. Then, one may select the highest (to Router R2) or the lowest (to Router R3) for instance.

Repeating these operations for each hop to the destination results in load balancing and optimization of overall bandwidth use within the internetwork. Accordingly, each TCP connection is considered a unique path, achieving "TCP connection based routing". For optimal operation "per packet multipath" is disabled.

Assume each router is assigned a so-called weight (p) stored in the routing tables, such as is the case with OSPF. For instance, assume routers R2, R3 and R4 are assigned weights p2, p3 and p4 respectively. Those weights should be applied to the second step of the above described process, and lead to p2H2, p3H3 and p4H4, respectively (so called "p.H" weighted values).

If the the goal is to minimize network "costs", the weights "p" should be based on link costs or shortest path considerations. If the goal is to optimize link bandwidth utilization by forcing most packets along the highest capacity link, the weight "p" should be based on link bandwidth. The weights can be assigned at the time of network configuration.

As a practical implementation matter, the standard IP address field is four bytes long and "p.H" values should be limited to four bytes in length. To limit the p.H length, the process can split a connection identifier (i.e., H2, H3, and H4) into two 2-byte long half-words and then XOR the two half-words into a single two byte word, prior to assignment of the weights p2, p3 and p4 respectively.

One significant advantage of the present invention is that the method can be implemented in existing internetwork systems without a need for extensive modifications of existing hardware and interfaces. Fairly simple software can be added to existing network routers to support the weighted hash-coding operations and path selection steps described above. The solution matches a source IP address, source port and a destination port of the TCP connection with the next hop IP address of the corresponding route.

While there has been described what is considered to be a preferred embodiment of the invention, variations and modifications in that embodiment will occur to those skilled in the art once they learn of the embodiment. Therefore, it is intended that the appended claims shall be construed to include both the preferred embodiment and all variations and modifications as fall within the true spirit and scope of the invention.

What is claimed is:

1. A method for improving routing distribution within an internet through next hop selection between routers (R) identified by their respective IP addresses to direct data traffic from a source (S) identified by a source IP address and a source port identification to a destination (T) identified by a target port identification, said method including:

determining equivalent routes toward the destination (T) host, each of said equivalent routes being defined by next router (R) IP address;

performing a first predefined logical operation between said source (S) IP address, S port identification and T port identification to derive therefrom a connection identifier (H0);

performing a second predefined logical operation between H0 and each next equivalent route R IP address, to derive next hop selection identifiers therefrom; and selecting the next hop based on a predefined criterion among said selection identifiers;

wherein said equivalent routes determination is based on using conventional Routing Information Protocol (RIP) and wherein said first predefined logical operation includes:

aggregating said source (S) and destination (T) ports identifications into a single word (M1); and, performing a logical XOR operation between said word M1 and the word M2 representing the source (S) IP address to derive said connection identifier (H0).

2. A method for improving routing distribution within an internet through next hop selection between routers (R) identified by their respective IP addresses to direct data traffic from a source (S) identified by a source IP address and a source port identification to a destination (T) identified by a target port identification, said method including:

determining equivalent routes toward the destination (T) host, each of said equivalent routes being defined by next router (R) IP address;

performing a first predefined logical operation between said source (S) IP address, S port identification and T port identification to derive therefrom a connection identifier (H0);

performing a second predefined logical operation between H0 and each next equivalent route R IP address, to derive next hop selection identifiers therefrom; and selecting the next hop based on a predefined criterion among said selection identifiers;

wherein said equivalent routes determination is based on using conventional Open Short Path First (OSPF) and Per Packet Multipath methods and wherein said first predefined logical operation includes:

aggregating said source (S) and destination (T) ports identifications into a single word (M1); and, performing a logical XOR operation between said word M1 and the word M2 representing the source (S) IP address to derive said connection identifier (H0).

3. A method according to claim 2 or 1 further characterized in that said second predefined logical operation between H0 and each next equivalent route R IP address to derive a selection identifier therefrom, is a logical XOR operation.

4. A method according to claim 3 further characterized in that each next hop selection identifier is assigned a "weight" (p) stored within a corresponding router's routing table.

5. A method according to claim 4 further characterized in that the weight (p) is established as a function of hop costs.

6. A method according to claim 5 further characterized in that said weight (p) is established as a function of link bandwidths.

7. A method according to claim 6 further characterized in that each said selection identifiers is split into two half words and corresponding half words are XORed prior to being weighted.

* * * * *